United States Patent Office 3,156,682
Patented Nov. 10, 1964

3,156,682
HYDROXYLATED POLYMER PRODUCTS AND
PREPARATION THEREOF
Charles C. Kirk, Laurel, and Razmic S. Gregorian, Silver
Spring, Md., assignors to W. R. Grace & Co., New
York, N.Y., a corporation of Connecticut
No Drawing. Filed Oct. 25, 1961, Ser. No. 147,431
2 Claims. (Cl. 260—94.9)

This invention relates to hydroxylated polymer products and methods of preparing same. More particularly this invention is concerned with the formation of polymeric material containing hydroxy groups which are useful as intermediates in subsequent crosslinking or grafting operations.

Summarily, this invention comprises subjecting polymeric material containing carbonyl groups to the action of a reducing compound and thereafter contacting the polymeric material with water thus forming hydroxylated polymeric material. The reducing compounds employable in the invention are those which normally reduce carbonyl groups to alcohols. One type of reducing compound operable in the instant invention is a Grignard reagent of the nominal formula:

$$RMgX$$

wherein R is an alkyl and X is a halide.

By the term "carbonyl group" as used throughout this invention is meant a ketone or aldehyde group. The carbonyl groups may comprise a part of the main polymer chain or may be present on a branch or both.

The carbonyl groups may be introduced in any of various ways, e.g., by oxidation of hydrocarbon in polymer chains or alternatively, by polymerization or copolymerization of carbonyl-containing monomers. Such monomers include but are not limited to methyl vinyl ketone, acrolein, and carbon monoxide to name a few. When these monomers are copolymerized, the comonomer can be a polymerizable olefin, styrene, or other monomer. No limitation is placed on the relative proportions of comonomer to carbonyl-containing monomer. It should be noted that subsequent formation of hydroxyl groups can occur only by reduction of the carbonyl groups.

Olefin polymers such as polyethylene described in U.S. 2,153,553 and in U.S. 2,816,883 and polypropylene described in Belgium 543,259 are well known in the art today and are generally characterized by their organic solvent solubility and their thermoplastic properties. Lately, several methods have been tried with varying success to modify the physical properties of these polymers by crosslinking the polymer and/or grafting other monomers there onto. Such methods include electron impingement of the polymer and blending of free radical-liberating substances into the polymer.

In regard to crosslinking polymers, the methods employed to date have involved blending of free radical liberating substances into the polymer. For example, organic peroxides and azo compounds, the most widely utilized cross-linking agents, decompose and crosslink polymers by free radical mechanisms. Similarly, grafts are generally introduced by creating radical sites on the polymer chain by means of peroxides, radiation, or mechanical scission, followed by the addition of monomer which polymerizes at the radical site. Free radical cross-linking and grafting of polymeric material such as polyethylene has the disadvantage that for optimum efficiency the curing step must be performed in an oxygen free atmosphere. Thus there has been a long felt want of a method to crosslink or graft onto polyethylene which is operable in an oxygen containing atmosphere.

One object of this invention is to disclose intermediates operable in a subsequent crosslinking or grafting step in an oxygen containing atmosphere. Another object of the invention is to supply a polyethylene intermediate which is capable of being crosslinked or grafted onto by a non-radical mechanism.

The carbonyl groups in the polymeric material react with the metal alkyl reducing agents of the instant invention in the manner of a Grignard reaction thereby affording polymer that contains metal halide-oxygen-polymer bonding.

The advantages of the present system over crosslinking or grafting by a free radical mechanism include: (1) control of the degree of crosslinking or grafting by controlling the number of carbonyl groups and (2) the ability to crosslink or graft in the presence of oxygen. In free radical systems, an inert atmosphere is required, as oxygen has an adverse effect on crosslinking or grafting.

The process by which oxidation of the polymeric material is performed is not critical. Polyolefins can be readily oxidized by various well-known methods to give degraded polymers containing carbonyl groups. For example, polyolefins can be milled in air at a temperature in the range 160–200° C. Another method would include passing air into an oven over a polyolefin therein at a temperature of about 100–135° C. Still another method would be to suspend particles of the polyolefin in water or an organic solvent and either bubble air through the suspension or pressurize the system with air at 100–200° C. Yet another method would be to pass air at a temperature in the range of 100–200° C. through a fluidized bed of polyolefin particles. A further method would include pressing the polyolefin into film form and passing hot air at a temperature of 100–200° C. thereover.

After the polymer has been oxidized, the addition of the metal alkyl as, for example, a Grignard reagent results in Polymer-O-magnesium halide bonds in the following manner:

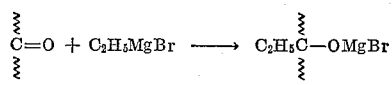

Subsequent hydrolysis of this reaction product yields a polyethylene derivative which contains hydroxyl groups as follows:

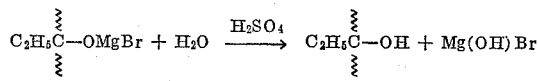

In the hydrolysis reaction mineral acid may, if desired, be used to neutralize the base formed.

The following examples are set down to illustrate the invention and are not deemed to limit its scope.

Throughout the instant invention the melt indices (MI) were measured under the conditions specified in ASTMD 1238–52T. The densities of the polymer were measured in a density gradient tube by the Bell Laboratories Proposed ASTM Method for the Measurement of Density of Solid Plastics by the Density Gradient Technique. The percent carbonyl in the oxidized polymer was measured by infra-red on a Perkin-Elmer Model 221 Spectrophotometer. In the examples, unless otherwise noted, a Brabender Plastograph Model P1–V2 equipped with a recording unit for measuring changes in torque was used in the crosslinking step. The aforesaid recording unit had a range of 0–1000 units equal to 0.1 kilogram-meter of torque. This range can be increased when necessary to 0–5000, i.e., equal to 0.5 kilogram-meter of torque by the addition of weights.

The degree of crosslinking can be measured in various ways. For example, the degree of crosslinking is related to the increase in torque measured by the Plastograph recorder from the time the crosslinking agent is added to the fused hydroxylated polymeric material until the reaction is discontinued either prematurely or because maximum torque has been achieved. The greater the degree of crosslinking the greater the viscosity of the polymeric material which in turn requires a greater torque in order to drive the Plastograph at a constant r.p.m.

That hydroxyl groups are present on the polymer chain is shown hereinafter by the reaction of the hydroxylated polymer with isocyanates. A further check of the degree of crosslinking is the change in melt index due to crosslinking of the polymeric material. Since melt index varies inversely wtih viscosity which varies directly with degree of crosslinking, a lower melt index after crosslinking evidences that crosslinking occurred. An indication of the amount of reduction is the decrease in the percent carbonyl after the addition of the reducing agent. Percent carbonyl is defined as $$\frac{\text{gms. C=O}}{\text{gms. polymer}} \times 100$$

Unless otherwise noted, all parts and percentages are by weight in the examples.

To show the percent decrease of carbonyl in the polymeric material after reduction, the addition of the reducing agent and the milling thereafter was performed in an inert atmosphere, i.e., nitrogen. Ordinarily, the steps in the invention are performed in air.

As will be shown hereinafter, reduction of polymeric material containing carbonyl groups by the present invention can be carried out in a heterogeneous two-phase system at temperatures below the melting point of the polymeric material.

*Example 1*

Two-thousand grams of commercial polyethylene in flake form having a melt index of 0.7 and a density of 0.96 were heated in air in a forced draft Fisher Isotemp. oven preset at 130° C. for 20 hours. The polyethylene upon removal from the oven had a carbonyl content of 0.452% as ascertained by infra-red analysis. The oxidized polyethylene was stored under nitrogen for use in the following example.

*Example 2*

To a reaction flask, equipped with mechanical stirrer and heating pad and containing 3.1 grams of Mg turnings in 20 ml. tetrahydrofuran, was added through a dropping funnel 14 grams (9.8 ml.) of ethyl bromide with agitation. After the addition was complete, the flask was heated at about 60° C. for 1 hour. The contents of the reaction flask were transferred to a dropping funnel. The contents of the dropping funnel were charged to a reaction flask containing a suspension of 20 grams of oxidized polyethylene from Example 1 in 250 ml. of refluxing benzene. The suspended mixture was refluxed for 16 hours and then hydrolyzed by being poured over an agitated mixture of 100 cc. of 10% $H_2SO_4$ and about 50 grams of ice. After 1 hour the hydrolyzed polymeric material was filtered off, washed with water and dried in an oven at 60° C. overnight. The thus dried hydrolyzed polyethylene on infra-red analysis had a carbonyl content of 0.135%.

*Example 3*

Two-hundred grams of commercial polyethylene in flake form having a melt index of 0.7 and a density of 0.96 were heated in a forced draft Fisher Isotemp. oven preset at 125° C. for about 25 hours. The oxidized polyethylene had a carbonyl content of 0.796%. The oxidized polyethylene was stored under nitrogen for use in the following example.

*Example 4*

To a reaction flask, equipped with stirrer and heating pad and containing 3.1 grams of Mg turnings in 20 ml. of sodium-distilled tetrahydrofuran, was added 14 grams (9.8 ml.) of ethyl bromide by means of a dropping funnel. The reaction mixture was stirred for 1 hour. The contents of the flask were then transferred by means of a dropping funnel to another reaction flask containing 100 grams of polyethylene from Example 3 in 960 ml. of refluxing sodium dried benzene. After refluxing overnight, the contents of the flask were poured over an acid-ice mixture (40 ml. of conc. $H_2SO_4$ in 300 grams ice). After 1 hour of vigorous stirring, the polymer was filtered off, washed with water and dried in a vacuum oven overnight. The dried hydroxylated polyethylene had a carbonyl content of 0.32%. To show the ability of the hydrolyzed polyethylene to crosslink in the presence of diisocyanates, the following run was made.

*Example 5*

Thirty-five grams of hydroxylated polyethylene from Example 4 was milled under a nitrogen blanket on a Brabender Plastograph at 160° C. until a constant torque was obtained. One ml. of 2,4-toluene diisocyanate was added to the Brabender and milling continued for 25 minutes. The increase in torque measured from the time the 2,4-toluene diisocyanate was added until the end of the 25 minute milling period was 2190 meter-grams. On characterization, the crosslinked polyethylene showed absorption at 1740 cm.$^{-1}$ by infra-red analysis, indicating the presence of urethane carbonyl bonds.

The reduction step is operable at temperatures in the range 50–300° C. or more. When the reduction step is carried out in solution, the temperature ranges from the melting point of the polymeric material up to 300° C. or more. When the reducing step is carried out in suspension in a two-phase heterogeneous system, any of various inert hydrocarbon solvents for the metal alkyl reducing agents having a boiling point greater than 50° C. can be employed at temperatures below the solution temperature of the polymer. Such solvents include benzene, toluene, hexane, cyclohexane and other hydrocarbons.

The reducing and hydrolyzing steps of the instant invention are also operable in solution. High boiling solvents such as toluene, xylene, decahydronaphthalene and the like can be employed for such a purpose in the case of polyethylene. Even lower boiling hydrocarbon solvents such as benzene can be used if superatmospheric pressure is employed. However, for ease of handling it is preferred when an inert hydrocarbon solvent is used to carry out the aforementioned steps in suspension at temperatures below the solution temperature of the polymer, e.g., in the range 50–100° C. for polyethylene.

The invention is preferably operated at atmospheric pressure.

For any given concentration of carbonyl in the polymeric material to be reduced, the amount of reduction is dependent upon the amount of metal alkyl reducing agent added. For Grignard reagents, a mole ratio of carbonyl: Grignard reagent in the range of 1:0.1 to 100 or more is operable. A preferred range is 1:10 to 50 respectively.

When carbonyl groups are introduced into the polymeric material by oxidation, it is preferred that oxidation stabilizers, i.e., antioxidants not be present. However, even if antioxidants are present the invention is operable, only requiring the oxidation step to be of longer duration in order to use up the antioxidant prior to forming carbonyl groups.

The hydroxylated polymeric material of this invention has many and varied uses. For example, the hydroxylated polymeric material can be used as an intermediate in a non-radical crosslinking operation wherein isocyanates are used as the crosslinking agent.

Polyethylene containing polar groups such as those introduced by oxidation is useful in the preparation of blends and emulsions. However, the presence of carbonyl groups in the oxidized polymer activates the polymer to degradation by ultra-violet light. The oxidized polymer can be deactivated without decreasing the number of polar groups by reducing the carbonyl groups to hydroxyl groups by the method of this disclosure.

We claim:

1. The process of forming hydroxylated polyethylene which comprises heating in suspension polyethylene containing carbonyl groups in an inert hydrocarbon solvent having a boiling point greater than 50° C. at a temperature below the solution temperature of the polymer in the presence of a Grignard reagent of the general formula RMgX wherein R is an alkyl and X is a halide and thereafter adding water to said suspension.

2. The process according to claim 1 wherein the water is in the vaporous phase.

References Cited by the Examiner
UNITED STATES PATENTS

| | | | |
|---|---|---|---|
| 3,082,192 | 3/63 | Kirshenbaum | 260—94.9 |
| 3,084,141 | 4/63 | Kraus et al. | 260—94.9 |

OTHER REFERENCES

Noller: Textbook of Organic Chemistry; W. B. Saunders Co., 1951.

JOSEPH L. SCHOFER, *Primary Examiner*.

WILLIAM H. SHORT, *Examiner*.